United States Patent
Kajigaya

(10) Patent No.: US 10,747,463 B2
(45) Date of Patent: Aug. 18, 2020

(54) APPARATUSES AND METHODS FOR ACCESSING HYBRID MEMORY SYSTEM

(71) Applicant: Micron Technology, Inc., Boise, ID (US)

(72) Inventor: Kazuhiko Kajigaya, Iruma (JP)

(73) Assignee: Micron Technology, Inc., Boise, ID (US)

( * ) Notice: Subject to any disclaimer, the term of this patent is extended or adjusted under 35 U.S.C. 154(b) by 274 days.

(21) Appl. No.: 15/669,753

(22) Filed: Aug. 4, 2017

(65) Prior Publication Data

US 2019/0042120 A1    Feb. 7, 2019

(51) Int. Cl.
*G06F 3/06* (2006.01)

(52) U.S. Cl.
CPC ............ *G06F 3/0647* (2013.01); *G06F 3/068* (2013.01); *G06F 3/0625* (2013.01); *G06F 3/0685* (2013.01); *G06F 2212/205* (2013.01); *G06F 2212/7208* (2013.01)

(58) Field of Classification Search
CPC ....... G06F 2212/205; G06F 2212/7208; G06F 13/14–36; G06F 13/1694; G06F 3/0647; G06F 3/0685; G06F 13/28; G06F 13/4022; G06F 3/0646; G06F 3/0625
See application file for complete search history.

(56) References Cited

U.S. PATENT DOCUMENTS

| 2008/0062808 | A1* | 3/2008 | Kawaguchi | G11C 5/02 365/230.06 |
| 2012/0155160 | A1 | 6/2012 | Alam et al. | |
| 2013/0275682 | A1* | 10/2013 | Ramanujan | G06F 13/1684 711/122 |

(Continued)

OTHER PUBLICATIONS

Hirofuchi, Takahiro & Takano, Ryousei. (Oct. 2016). RAMinate: Hypervisor-based Virtualization for Hybrid Main Memory Systems. 10.1145/2987550.2987570. pp. 1-15 (Year: 2016).*

(Continued)

*Primary Examiner* — Reginald G Bragdon
*Assistant Examiner* — Curtis James Kortman
(74) *Attorney, Agent, or Firm* — Dorsey & Whitney LLP

(57) ABSTRACT

Apparatuses and methods for controlling word lines and sense amplifiers in a semiconductor device are described. An example apparatus includes: a memory array including a plurality of memory cells; a memory controller that transmits a command signal, address signals and further provides and receives data signals; a first port including: a first command terminal that receives the first command signal from the memory controller; first address terminals that receive first address signals from the memory controller; and first data terminals that receive first data signals from the memory controller and further transmit first data signals to the memory controller; and a second port including: a second command terminal that receives a second command signal from the memory controller; second address terminals that receive second address signals from the memory controller; and second data terminals that receive second data signals from an external apparatus other than the memory controller and further transmit second data signals to the external apparatus.

8 Claims, 11 Drawing Sheets

(56) References Cited

U.S. PATENT DOCUMENTS

2017/0357581 A1* 12/2017 Yanagidaira ............ G06F 13/16

OTHER PUBLICATIONS

Su, ChunYi & Leon, Edgar & Loh, Gabriel & Roberts, David & Cameron, Kirk & Nikolopoulos, Dimitrios & Supinski, Bronis. (2015). HpMC: An Energy-aware Management System of Multi-level Memory Architectures. 10.1145/2818950.2818974. pp. 1-13 (Year: 2015).*

Knyaginin, Dmitry. "Towards Large-Capacity and Cost-Effective Main Memories." (May 8, 2017), Chalmers, Computer Science and Engineering, Doctoral Thesis, pp. i-147 (Year: 2017).*

Crooke, Rob et al., "Intel Non-Volatile Memory Inside. The Speed of Possibility Outside" in INTEL Developer Forum, 2015 (revised Apr. 2015).

Meza, Justin et al., "Enabling Efficient and Scalable Hybrid Memories Using Fine-Granularity DRAM Cache Management." Published by the IEEE Computer Society 2012, Posted to the IEEE & CSDL on Mar. 15, 2012.

Ramos, Luiz et al., "Page Placement in Hybrid Memory Systems", ICS'11, May 31-Jun. 4, 2011, Tuscon, Arizona, USA.

* cited by examiner

APPARATUSES AND METHODS FOR ACCESSING HYBRID MEMORY SYSTEM

BACKGROUND

High speed memory access, extended memory system and reduced power consumption are features that are demanded from semiconductor devices. In recent years, a computer system has been provided that adopts hybrid memory system as a main memory system including a plurality of types of memory devices (e.g., dynamic random access memory (DRAM) and storage class memory (SCM)), and the main memory system provides volatile memory and non-volatile storage and various access speeds. For example, a typical memory access to the DRAM is high in speed, however its storage is volatile and its capacity is approaching to its limit. On the other hand, the SCM provides non-volatile storage and easy scaling to increase its capacity, however the SCM provides slower access speed than the DRAM. Thus, depending on the required access speed and volatility, a user can select one of these memory devices to store data.

A typical memory access to the hybrid memory system including the DRAM and the SCM may be executed by a memory controller that uses the same memory channel. In data transfer between the DRAM and the SCM, the memory controller reads data in one memory device in the hybrid memory system and temporarily buffers the data, and then writes the buffered data into the other memory device in the hybrid memory system. Thus, the same memory channel limits access to each memory device. Further, power consumption may be increased due to considerably large stray capacitance of wirings between the memory controller and the plurality of memory devices.

DETAILED DESCRIPTION OF PREFERRED EMBODIMENT'S

Various embodiments of the present disclosure will be explained below in detail with reference to the accompanying drawings. The following detailed description refers to the accompanying drawings that show, by way of illustration, specific aspects and embodiments in which the present invention may be practiced. These embodiments are described in sufficient detail to enable those skilled in the art to practice the present invention. Other embodiments may be utilized, and structure, logical and electrical changes may be made without departing from the scope of the present invention. The various embodiments disclosed herein are not necessary mutually exclusive, as some disclosed embodiments can be combined with one or more other disclosed embodiments to form new embodiments.

Figure 1:
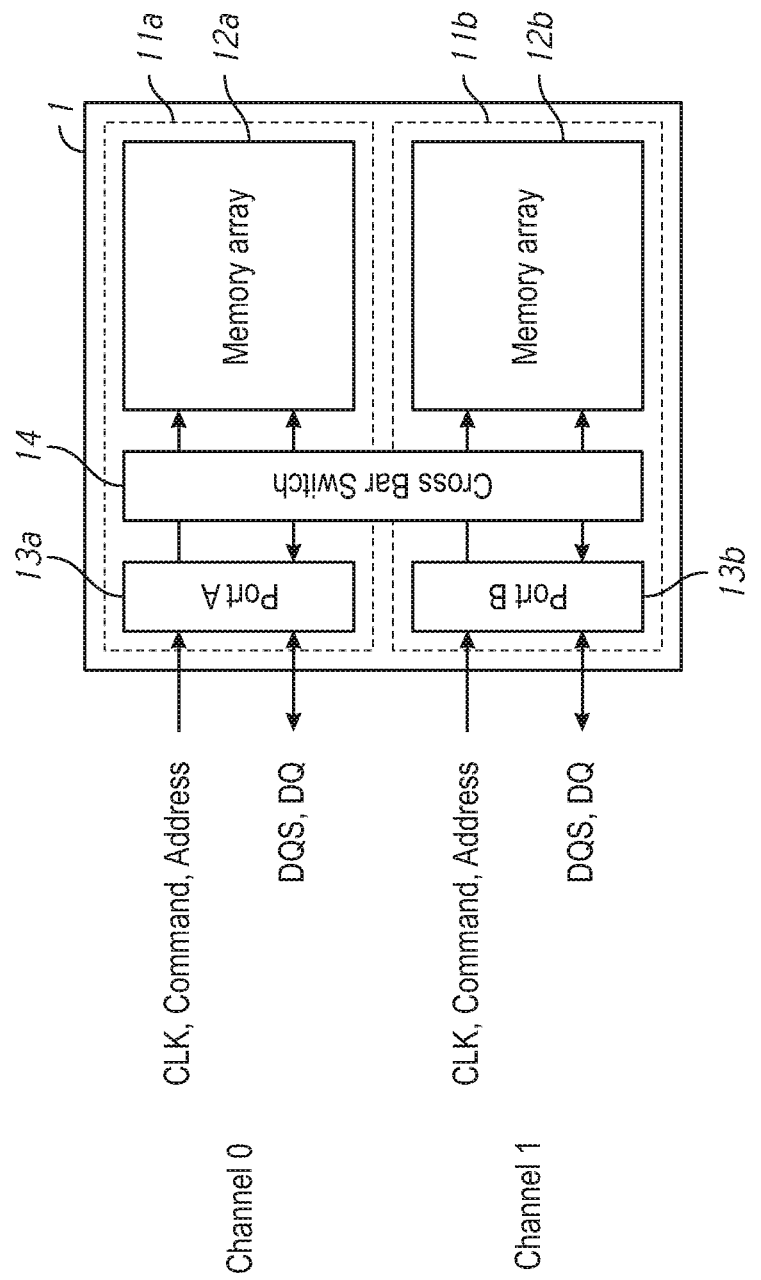
FIG. 1 is a block diagram of a memory chip in a hybrid memory system, in accordance with an embodiment of the present disclosure.

FIG. 1 is a block diagram of a memory chip 1 in a hybrid memory system, in accordance with an embodiment of the present disclosure. For example, the memory chip 1 may be a multi-channel memory chip including a plurality of channels Channel 0 11*a* and Channel 1 11*b* that may be provided for accessing a plurality of memory arrays 12*a* and 12*b*, respectively. For example, the memory arrays 12*a* and 12*b* may be either a volatile memory (e.g., DRAM, such as LPDDR) or a non-volatile memory (e.g., SCM, such as flash, MRAM, and PCRAMM). The memory arrays 12*a* and 12*b* may receive signals from a memory controller (not shown) for either reading data out to the memory controller or writing data from the memory controller on Channel 0 11*a*. For example, Channel 0 11*a* may include an input/output port, port A 13*a* including command/address terminals, a clock terminal and data (DQ) and data strobe (DQS) terminals coupled to the memory controller. The command/address terminals and the clock terminal of the port A 13*a* may receive command/address signals and a clock signal CLK from the memory controller, respectively. The DQ and DQS terminals of the port A 13*a* may receive and transmit data and data strobe signals between the memory controller and the memory arrays 12*a* and 12*b* in the memory chip 1. The memory arrays 12*a* and 12*b* may receive signals from a memory controller (not shown) for either reading data out to another memory chip (not shown) or writing data from the other memory chip on Channel 1 11*b*. For example, Channel 1 11*b* may include an input/output port, port B 13*b* including command/address terminals, a clock terminal and DQ and DQS terminals coupled to the memory controller. The command/address terminals and the clock terminal of the port B 13*b* may receive command/address signals and a clock signal CLK from the memory controller, respectively. The DQ and DQS terminals of the port B 13*b* may receive and transmit data and the data strobe signals between the other memory chip and the memory arrays 12*a* and 12*b* in the memory chip 1. For example, the memory controller may provide the clock signal CLK, the command/address signals for communicating data between the memory controller and the memory arrays 12a and/or 12b in the memory chip 1 to the port A 13a on Channel 0 11a. The memory controller may provide the clock signal CLK, a command signal, and address signals for communicating data between the other memory chip and the memory arrays 12a and/or 12b in the memory chip 1 to the port B 13b on Channel 1 11b.

For example, the memory chip 1 may include a cross bar switch 14. The cross bar switch 14 may be disposed between the input/output ports, port A 13a and port B 13b, and the memory arrays 12a and 12b. The cross bar switch 14 may receive data from the memory array 12a or the memory array 12b and transmit the data to the memory controller via the port A 13a or to the other memory chip via the port B 13b for reading out the data. The cross bar switch 14 may receive data from the port A 13a or the port B 13b and transmit to the memory array 12a or the memory array 12b for writing data from the memory controller via the port A 13a or for writing data from the other memory chip via the port B 13b. Thus, the port B 13b may transfer data from/to the other memory chip.

Figure 2:
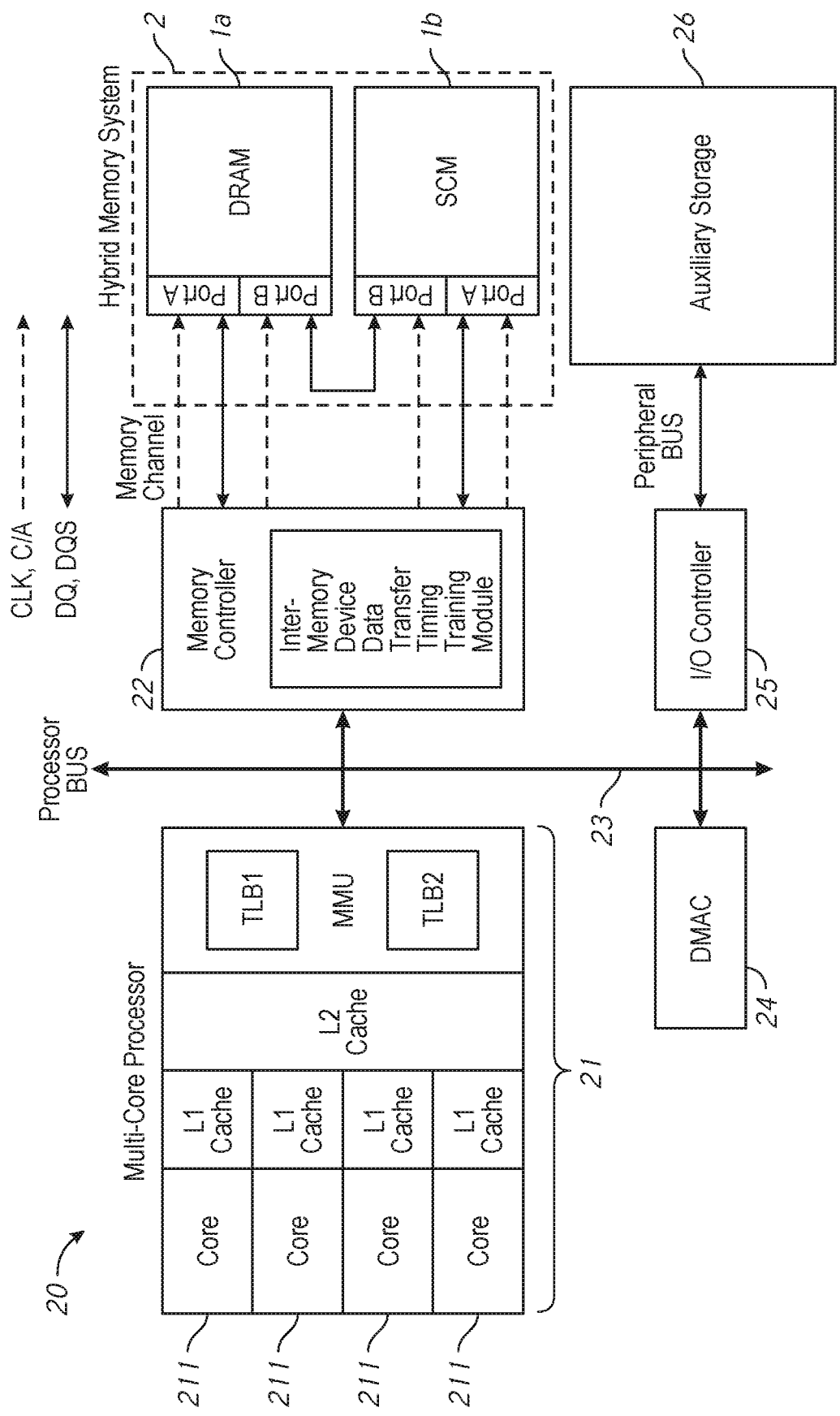
FIG. 2 is a block diagram of a computer system including a hybrid memory system including the memory chip of FIG. 1 in a parallel mode, in accordance with an embodiment of the present disclosure.

FIG. 2 is a block diagram of a computer system 20 including a hybrid memory system 2 including the memory chip of FIG. 1 in a parallel mode, in accordance with an embodiment of the present disclosure. The computer system 20 includes a multi-core processor 21 including a plurality of cores 211, multi-level caches, such as level-1 (L1) caches for corresponding cores 211, a level-2 (L2) cache for the multi-core processor 21, and a memory-management unit (MMU) including a plurality of translation lookaside buffers TLB1 and TLB2 that may be caches for storing address-translations of a virtual address in virtual memory to a physical address in physical memories, such as the memory chips 1a and 1b, respectively. In some embodiments of the present disclosure, each of the translation lookaside buffers TLB1 and TLB2 may include a page table corresponding to respective TLB. The plurality of cores 211 are processing circuits which read and execute program instructions independently.

The computer system 20 may also include a memory controller 22, an input/output (110) controller 25 that handles data access to an auxiliary storage 26 via a peripheral bus, and a direct memory access controller (DMAC) 24 that controls a processor internal bus 23 that provides data transfer between memories and other processor/controller circuits. For example, the memory controller 22 may provide access requests to the hybrid memory system 2 from the plurality of cores 211. The memory controller 22 may provide a clock signal, a command signal and address signals indicative of an address in the hybrid memory system 2 to the hybrid memory system 2. The memory controller 22 may handle data access to the hybrid memory system 2 that may include different types of memory chips 1a and 1b. In some embodiments, the memory chip 1a is a volatile memory chip as indicated as DRAM, and the memory chip 1b is a non-volatile memory chip as indicated as SCM. For example, each of the memory chips 1a and 1b has two ports, port A and port B, as discussed with reference to FIG. 1. While writing data by storing the data in the memory chip 1a or 1b in the hybrid memory system 2, the memory controller 22 may provide write data to data terminals of port A of the memory chip 1a or 1b with a write command to a command terminal, as previously described, of port A of corresponding memory chip 1a or 1b. While reading the stored data from the hybrid memory system 2, the memory, controller 22 may provide a read command to the command terminal of port A and receive the data from data terminals of port A of corresponding memory chip 1a or 1b.

The memory controller 22 may transfer data between the memory chips 1a and 1b. Data terminals of ports B of the memory chips 1a and 1b may be coupled to each other. The memory controller 22 may provide command, address and clock signals to command, address and clock terminals of ports B of the memory chips 1a and 1b. For transferring data from the memory chip 1a to the memory chip 1b, the memory controller 22 may provide the clock signal CLK, the command signal indicative of a read command and the address signals indicative of an address in the memory chip 1a (C/A) to port B of the memory chip 1a and simultaneously provide the clock signal CLK, the command signal indicative of a write command and the address signals in the memory chip 1b (C/A) to the port B of the memory chip 1b as shown in dotted lines. Responsive to the command signals, data may be directly transferred from the data terminals of port B of the memory chip 1a to the data terminals of port B of the memory chip 1b. On the other hand, for transferring data from the memory chip 1b to the memory chip 1a, the memory controller 22 may provide the clock signal CLK, the command signal indicative of a write command and the address signals indicative of an address in the memory chip 1a (C/A) to port B of the memory chip 1a and simultaneously provide the clock signal CLK, the command signal indicative of a read command and the address signals in the memory chip 1b (C/A) to port B of the memory chip 1b. Responsive to the command signals, data may be directly transferred from the data terminals of port B of the memory chip 1b to the data terminals of port B of the memory chip 1a. Since the memory controller 22 provides the clock signal CLK, the memory chips 1a and 1b may operate at the same clock frequency based on the clock signal CLK. The memory controller 22 may train the memory chips 1a and 1b for a data transfer timing.

For example, the memory chip 1a may be a volatile memory chip (e.g., DRAM) and the memory chip 1b may be a non-volatile memory chip (e.g., SCM), such as flash memory, nonvolatile random-access memory (RAM), such as ferroelectric RAM (FeRAM), spin-transfer-torque RAM (STT-RAM), phase-change RAM (PCRAM), resistance change RAM (ReRAM), or the like. For example, the memory chips 1a and 1b may be mounted in the same package. Alternatively, the memory chips 1a and 1b may be arranged in proximity to each other. Preferably, wirings between the memory chips 1a and 1b may be substantially short for lower power consumption.

Figure 3:
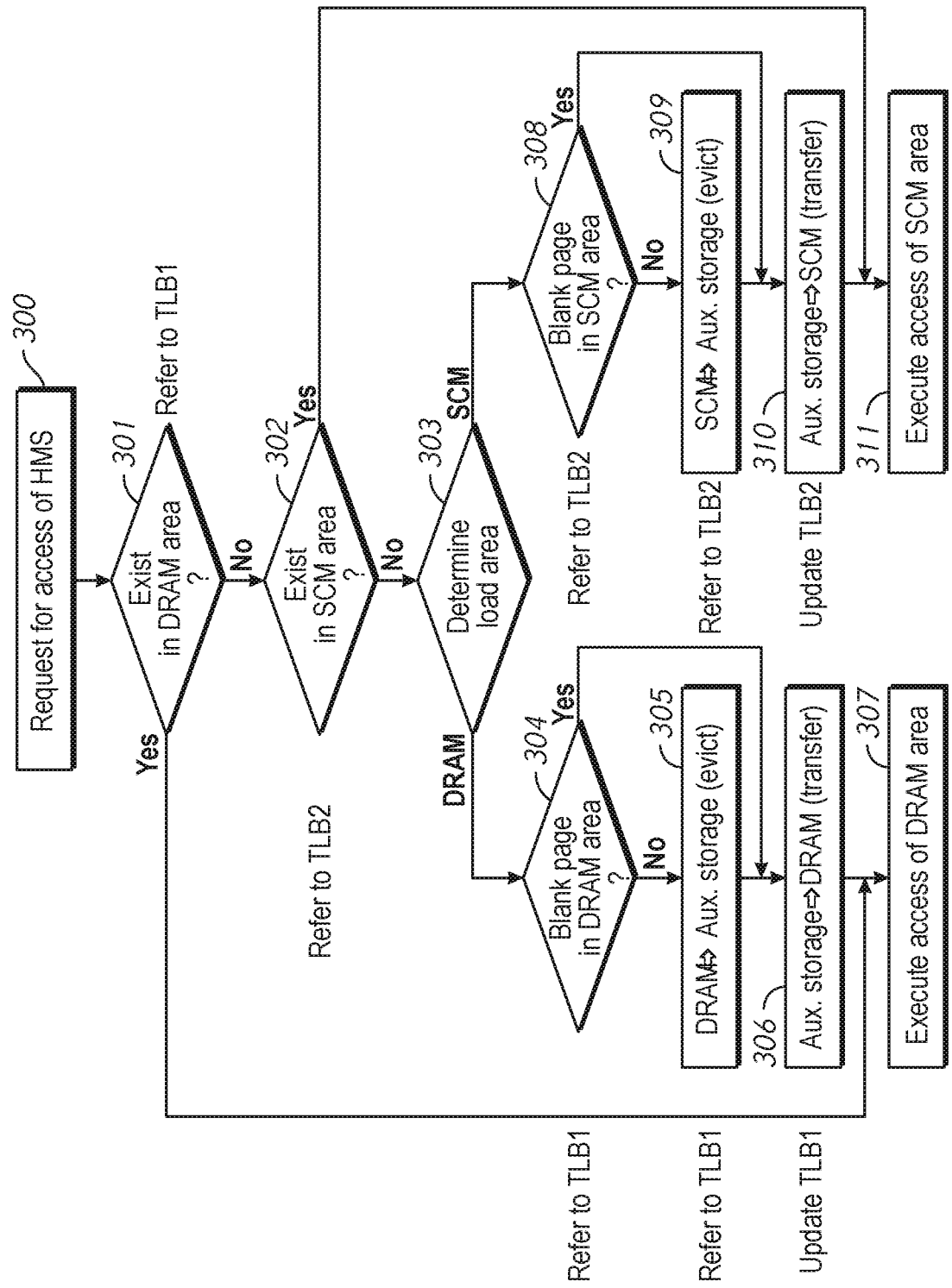
FIG. 3 is a flow diagram of accessing the hybrid memory system of FIG. 1 in the parallel mode, in accordance with an embodiment of the present disclosure.

The memory controller 22 may include an inter-memory device data transfer timing training module that provides data transfer timing training between the memory chips 1a and 1b. Each memory chip of the memory chips 1a and 1b may include a timing adjustment block for the data transfer timing training. FIG. 3 is a flow diagram of accessing the hybrid memory system 2 of FIG. 1 or FIG. 2 in the parallel mode, in accordance with an embodiment of the present disclosure. In operation block 300, the multi-core processor 21 may issue a request of access of hybrid memory system (HMS) 2 using a virtual address to an operation system (OS). In operation block 300, the MMU in the multi-core processor 21 may refer to a virtual page number associated with the virtual address in a page table, obtain a physical page number associated with a physical page including a physical address associated with a memory cell to access in the HMS 2 based on the virtual address, and further obtain the TLB1 for the memory chip 1a. In operation block 301, the MMU may check whether the physical page is found (e.g., exists) in the memory chip 1a. (e.g., DRAM area) by referring to the TLB1. If the physical page is found in the memory chip 1a ("Yes" in operation block 301), the MMU may proceed to operation block 307. In operation block 307, the MMU may refer to the TLB1 for the memory chip 1a to translate the virtual address to the physical address in the memory chip 1a and may send a request to the memory controller 22 for accessing a memory cell in the memory chip 1a associated with the physical address.

If the physical page is not found in the memory chip 1a ("No" in operation block 301), the MMU may proceed to operation block 302. In operation block 302, the MMU may check whether the physical page is found (e.g., exists) in the memory chip 1b (e.g., SCM area) by referring to the TLB2. If the physical page is found in the memory chip 1b ("Yes" in operation block 302), the MMU may proceed to operation block 311. In operation block 311, the MMU may refer to the TLB2 for the memory chip 1b to translate the virtual address to the physical address in the memory chip 1b and may send a request to the memory controller 22 for accessing a memory cell in the memory chip 1b associated with the physical address.

If the physical page is not found in the memory chip 1b ("No" in operation block 302), the MMU may proceed to operation block 303. In operation block 303, the MMU may request the OS to process a page fault. The OS may identify a location of the requested physical page in an auxiliary storage 26 and to determine whether to load the requested physical page to an area in the memory chip 1a or to an area in the memory chip 1b according to a predetermined rule based on the location in the auxiliary storage.

If the OS determines that the requested physical page is to be loaded in the memory chip 1a in operation block 303 ("DRAM" in operation block 303), the MMU may further determine whether a blank page exists in the memory chip 1a (e.g., DRAM area) in operation block 304. If the blank page exists in the memory chip 1a ("Yes" in operation block 304), the direct memory access controller (DMAC) 24 may send a direct memory access (DMA) request for transferring the requested physical page in the auxiliary storage 26 to the blank page in the memory chip 1a to the memory controller 22 and the I/O controller 25 in operation block 306 and the MMU may update data in the TLB1 and proceed to operation block 307. If the blank page is not found in the memory chip 1a ("No" in operation block 304), the OS may select a page for eviction (e.g., swap-out) in the memory chip 1a to the auxiliary storage, identify a destination physical address where data in the page are to be evicted in the auxiliary storage, obtain a source physical address in the memory chip 1a for the page for eviction by referring to the TLB1, and may further send the DMA request to the direct memory access controller (DMAC) 24 in operation block 305. The direct memory access controller (DMAC) 24 may send the DMA request for transferring the data in the page of the memory chip 1a for eviction to the destination physical address in the auxiliary storage 26 to the memory controller 22 and the I/O controller and then proceed to operation block 306 and the MMU may update data in the TLB1.

If the OS determines that the requested physical page is to be loaded in the memory chip 1b in operation block 303 ("SCM" in operation block 303), the MMU may further determine whether a blank page exists in the memory chip 1b (e.g., SCM area) in operation block 308. If the blank page exists in the memory chip 1b ("Yes" in operation block 308), the direct memory access controller (DMAC) 24 may send a direct memory access (DMA) request for transferring the requested physical page in the auxiliary storage 26 to the blank page in the memory chip 1b to the memory controller 22 and the I/O controller 25 in operation block 310 and the MMU may update data in the TLB2 and proceed to operation block 311. If the blank page is not found in the memory chip 1b ("No" in operation block 308), the OS may select a page for eviction (e.g., swap-out) in the memory chip 1b to the auxiliary storage, identify a destination location where data in the page are to be evicted in the auxiliary storage, obtain a physical address in the memory chip 1b for the page for eviction by referring to the TLB2, and may further send the DMA request to the direct memory access controller (DMAC) 24 in operation block 309. The direct memory access controller (DMAC) 24 may send the DMA request for transferring the data in the page of the memory chip 1b for eviction to a specified position in the auxiliary storage 26 to the memory controller 22 and the I/O controller and then proceed to operation block 310 and the MMU may update data in the TLB2.

Figure 4A:
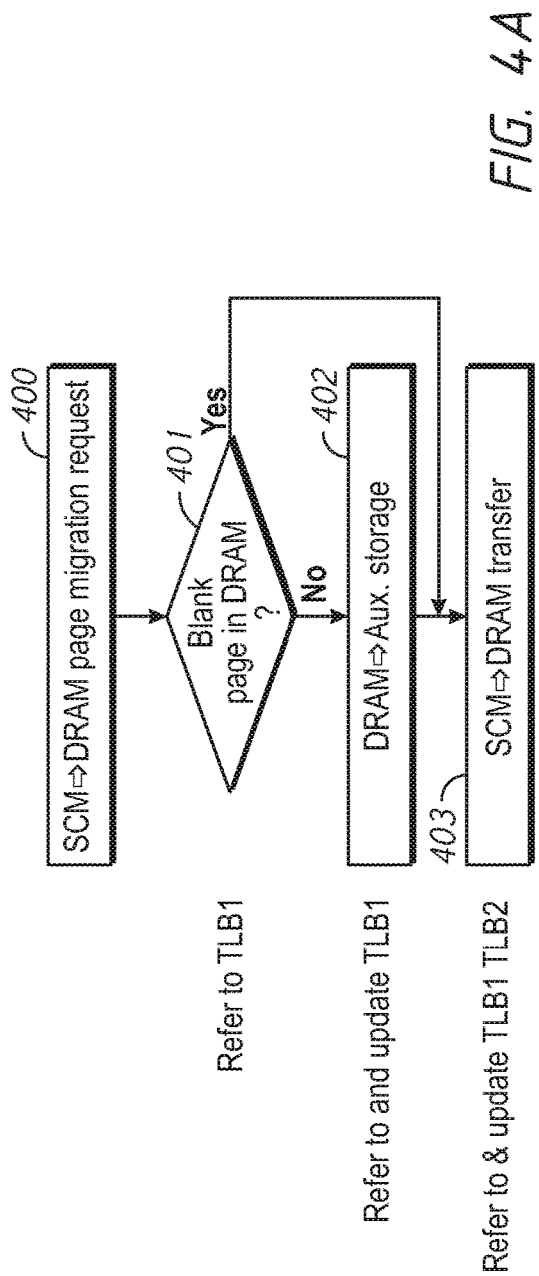
FIGS. 4A and 4B are flow diagrams of accessing the hybrid memory system of FIG. 1 in a page migration mode, in accordance with an embodiment of the present disclosure.
Figure 4B:
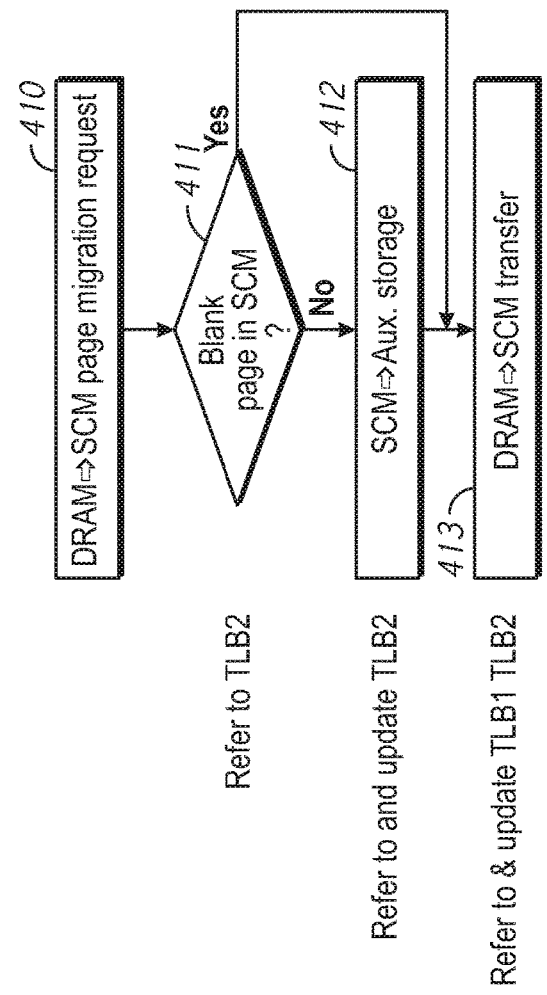

FIGS. 4A and 4B are flow diagrams of accessing the hybrid memory system of FIG. 1 or FIG. 2 in a page migration mode, in accordance with an embodiment of the present disclosure. For example, FIG. 4A is a flow diagram of handling page migration from the memory chip 1b (e.g., SCM) to the memory chip 1a (e.g., DRAM). In operation block 400, the multi-core processor 21 may issue a request of page migration from the memory chip 1b (e.g., SCM) to the memory chip 1a (e.g., DRAM), and then proceed to operation block 401. In operation block 401, the MMU may check whether a blank page is found (e.g., exists) in the memory chip 1a (e.g., DRAM area) by referring to the TLB1. If the blank page is found in the memory chip 1a ("Yes" in operation block 401), the MMU may proceed to operation block 403. In operation block 403, the MMU may refer to the 711132 for the memory chip 1b to translate a virtual address in a migration source page to a source physical address of in the memory chip 1b. The MMU may also refer to the TLB1 for the memory chip 1a to obtain a destination physical address in a migration destination area of in the memory chip 1a. The MMU may send a request for transferring data in the source physical address in the memory chip 1b to the destination physical address in the memory chip 1a to the memory controller 22. The MMU may further update address data of the TLB1 and the TLB2 in operation block 403 to end page migration from the memory chip 1b to the memory chip 1a. If the blank page is not found in the memory chip 1a ("No" in operation block 401), the MMU may proceed to operation block 402. The OS may select a page for eviction (e.g., swap-out) in the memory chip 1a to the auxiliary storage, identify a destination location where data in the page are to be evicted in the auxiliary storage, obtain a physical address in the memory chip 1a for the page for eviction by referring to the TLB1, and may further send the DMA request to the direct memory access controller (DMAC) 24 in operation block 402. The direct memory access controller (DMAC) 24 may send the DMA request for transferring the data in the page of the memory chip 1a for eviction to a specified position in the auxiliary storage 26 to the memory controller 22 and the I/O controller and then proceed to operation block 403.

For example, FIG. 4B is a flow diagram of handling page migration from the memory chip 1a (e.g., DRAM) to the memory chip 1b (e.g., SCM). In operation block 410, the multi-core processor 21 may issue a request of page migration from the memory chip 1a (e.g., DRAM) to the memory chip 1b (e.g., SCM), and then proceed to operation block 411. In operation block 411, the MMU may check whether a blank page is found (e.g., exists) in the memory chip 1b (e.g., SCM area) by referring to the TLB2. If the blank page is found in the memory chip 1b ("Yes" in operation block 411), the MMU may proceed to operation block 413. In operation block 413, the MMU may refer to the TLB1 for the memory chip 1a to translate a virtual address in a migration source page to a source physical address of in the memory chip 1a. The MMU may also refer to the 711132 for the memory chip 1b to obtain a destination physical address in a migration destination area of in the memory chip 1b. The MMU may send a request for transferring data in the source physical address in the memory chip 1a to the destination physical address in the memory chip 1b to the memory controller 22. The MMU may further update address data of the TLB1 and the TLB2 in operation block 413 to end page migration from the memory chip 1a to the memory chip 1b. If the blank page is not found in the memory chip 1b ("No" in operation block 411), the MMU may proceed to operation block 412. The OS may select a page for eviction (e.g., swap-out) in the memory chip 1b to the auxiliary storage, identify a destination location where data in the page are to be evicted in the auxiliary storage, obtain a physical address in the memory chip 1b for the page for eviction by referring to the TLB2, and may further send the DMA request to the direct memory access controller (DMAC) 24 in operation block 412. The direct memory access controller (DMAC) 24 may send the DMA request for transferring the data in the page of the memory chip 1b for eviction to a specified position in the auxiliary storage 26 to the memory controller 22 and the I/O controller and then proceed to operation block 413.

Figure 5:
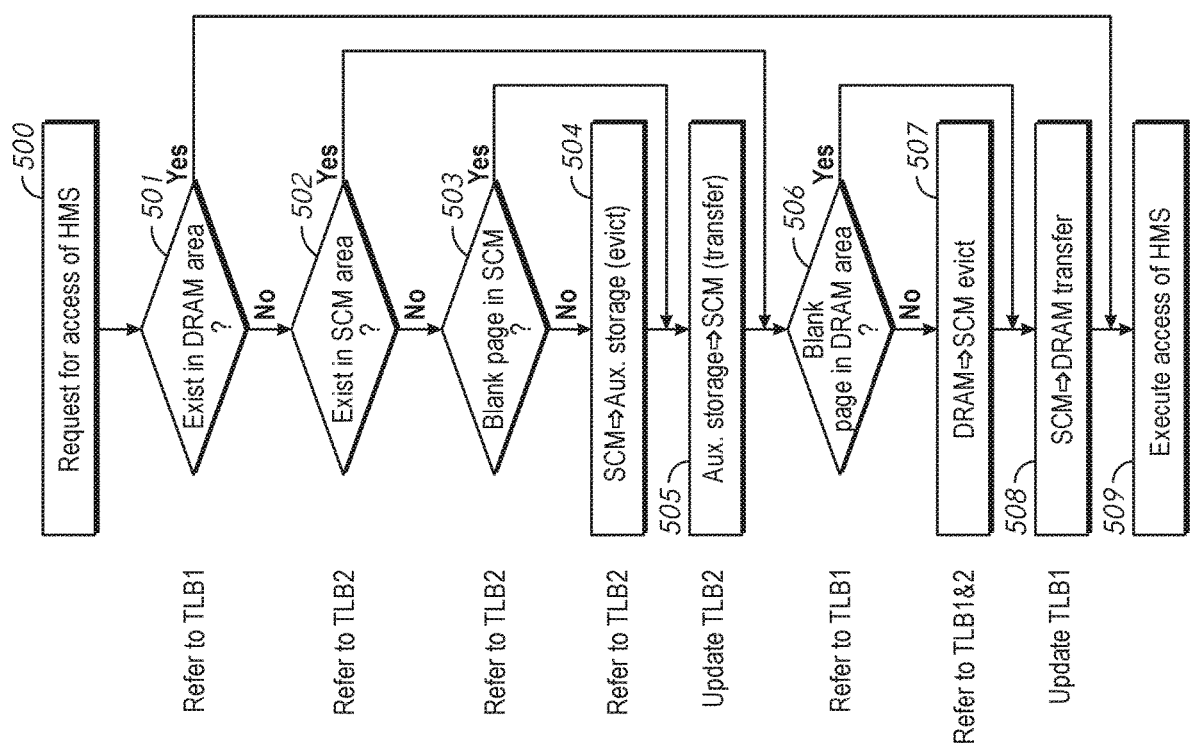
FIG. 5 is a flow diagram of accessing the hybrid memory system of FIG. 1 in a volatile-cache mode, in accordance with an embodiment of the present disclosure.

FIG. 5 is a flow diagram of accessing the hybrid memory system of FIG. 1 or FIG. 2 in a volatile-cache mode, in accordance with an embodiment of the present disclosure. In operation block 500, the multi-core processor 21 may issue a request of access of hybrid memory system (HMS) 2 using a virtual address to an operation system (OS). In operation block 500, the MMU in the multi-core processor 21 may refer to a virtual page number associated with the virtual address in a page table, obtain a physical page number associated with a physical page including a physical address associated with a memory cell to access in the HMS 2 based on the virtual address, and further obtain the TLB1 for the memory chip 1a. In operation block 501, the MMU may check whether the physical page is found (e.g., exists) in the memory chip 1a (e.g., DRAM area) by referring to the TLB1. If the physical page is found in the memory chip 1a ("Yes" in operation block 501), the MMU may proceed to operation block 509. If the physical page is not found in the memory chip 1a ("No" in operation block 501), the MMU may proceed to operation block 502. In operation block 502, the MMU may check whether the physical page is found (e.g., exists) in the memory chip 1b (e.g., SCM area) by referring to the TLB2. If the physical page is found in the memory chip 1b ("Yes" in operation block 502), the MMU may proceed to operation block 506.

If the physical page is not found in the memory chip 1b ("No" in operation block 502), the MMU may proceed to operation block 503. In operation block 503, the MMU may request the OS to process a page fault. In operation block 503, the MMU may further determine whether a blank page exists in the memory chip 1b (e.g., SCM area), referring to the TLB2. If the blank page exists in the memory chip 1b ("Yes" in operation block 503), the direct memory access controller (DMAC) 24 may send a direct memory access (DMA) request for transferring the requested physical page in the auxiliary storage 26 to the blank page in the memory chip 1b to the memory controller 22 and the I/O controller 25 in operation block 505 and the MMU may update data in the TLB2 and proceed to operation block 506. If the blank page is not found in the memory chip 1b ("No" in operation block 503), the OS may select a page for eviction (e.g., swap-out) in the memory chip 1b to the auxiliary storage, identify a destination physical address where data in the page are to be evicted in the auxiliary storage, obtain a source physical address in the memory chip 1b for the page for eviction by referring to the TLB2, and may further send the DMA request to the direct memory access controller (DMAC) 24 in operation block 504. The direct memory access controller (DMAC) 24 may send the DMA request for transferring the data in the page of the memory chip 1b for eviction to the destination physical address in the auxiliary storage 26 to the memory controller 22 and the I/O controller and then proceed to operation block 505.

As long as the physical page is not found in the memory chip 1a (except "Yes" in operation block 501), the MMU may proceed to operation block 506. In operation block 506, the MMU may further determine whether a blank page exists in the memory chip 1a (e.g., DRAM area). If the blank page exists in the memory chip 1a ("Yes" in operation block 506), the MMU may proceed to operation block 508. If the blank page is not found in the memory chip 1a ("No" in operation block 506), the MMU may select a page for eviction (e.g., swap-out) in the memory chip 1a to the memory chip 1b, identify a destination physical address where data in the page are to be evicted in the memory chip 1b, and obtain a source physical address in the memory chip 1a for the page for eviction by referring to the TLB1. The MMU may send a request for transferring data in the source physical address in the memory chip 1a to the destination physical address in the memory chip 1b to the memory controller 22 in operation block 507 and then proceed to operation block 508. In operation block 508, a page transfer may be executed. The MMU may send a request for transferring data in the source physical address in the memory chip 1b to the destination physical address in the memory chip 1a to the memory controller 22 in operation block 508 and the MMU may update data in the TLB1 and proceed to operation block 509.

Figure 6:
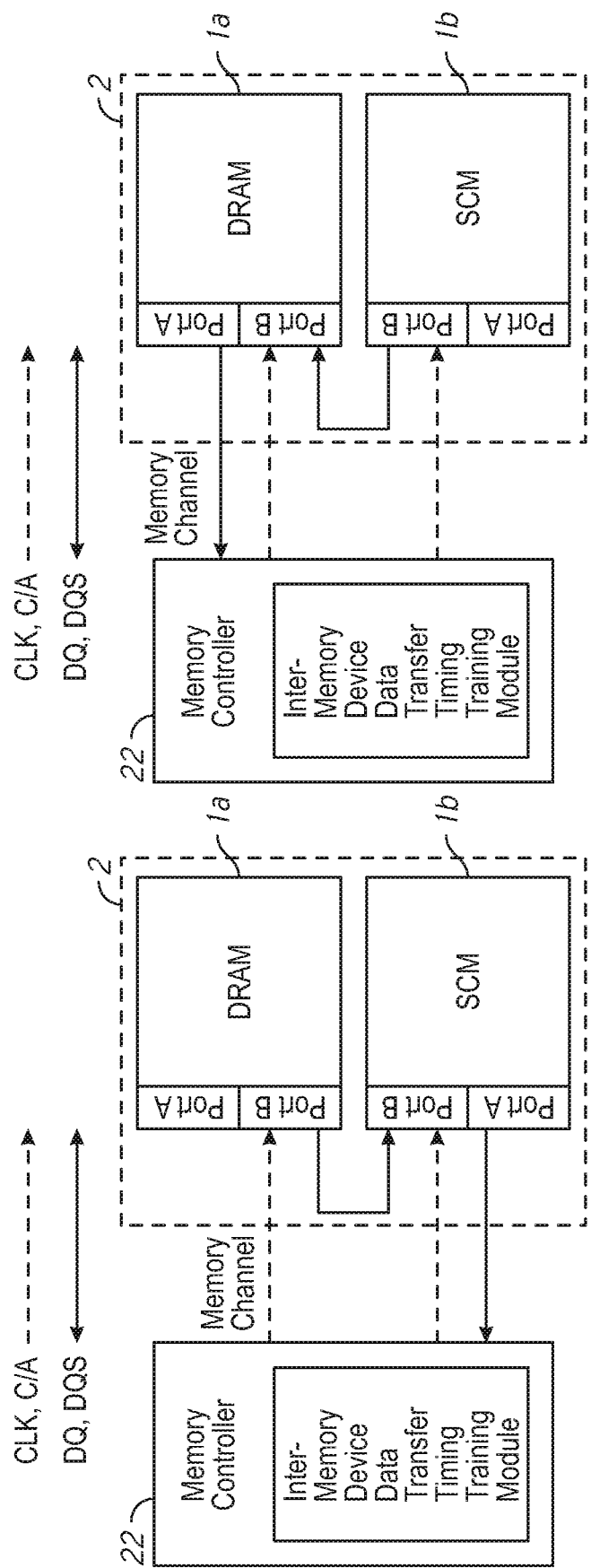
FIGS. 6A and 6B are schematic diagrams of accessing between a plurality of memory devices in the hybrid memory system of FIG. 1, in accordance with an embodiment of the present disclosure.

FIGS. 6A and 6B are schematic diagrams of accessing between a plurality of memory devices in the hybrid memory system of FIG. 1 or FIG. 2, in accordance with an embodiment of the present disclosure. In FIG. 6A, the memory controller 22 starts training by setting the memory chip 1a (e.g., DRAM) and the memory chip 1b (e.g., SCM) to a read mode and a write mode respectively. The memory chip 1a may adjust timings of a data strobe signal DQS and data signals DQ of port B. The memory chip 1b may capture a timing relationship of among a clock signal CLK, the data strobe signal DQS and the data signal DQ of port B from the memory chip 1a, and may transmit the timing relationship as a result to the memory controller 22 using port A. The memory controller 22 may determine timing configuration of the data strobe signal DQS and the data signals DQ of port 13 of the memory chip 1a based on the timing relationship received from the memory chip 1b. In FIG. 6B, the memory controller 22 starts training by setting the memory chip 1a (e.g., DRAM) and the memory chip 1b (e.g., SCM) to a write mode and a read mode respectively. The memory chip 1b may adjust timings of a data strobe signal DQS and data signals DQ of port B. The memory chip 1a may capture a timing relationship of among a clock signal CLK, the data strobe signal DQS and the data signal DQ of port B from the memory chip 1b and may transmit the timing relationship as a result to the memory controller 22 using port A. The memory controller 22 may determine timing configuration of the data strobe signal DQS and the data signals DQ of port B of the memory chip 1b based on the timing relationship received from the memory chip 1a.

Figure 7:
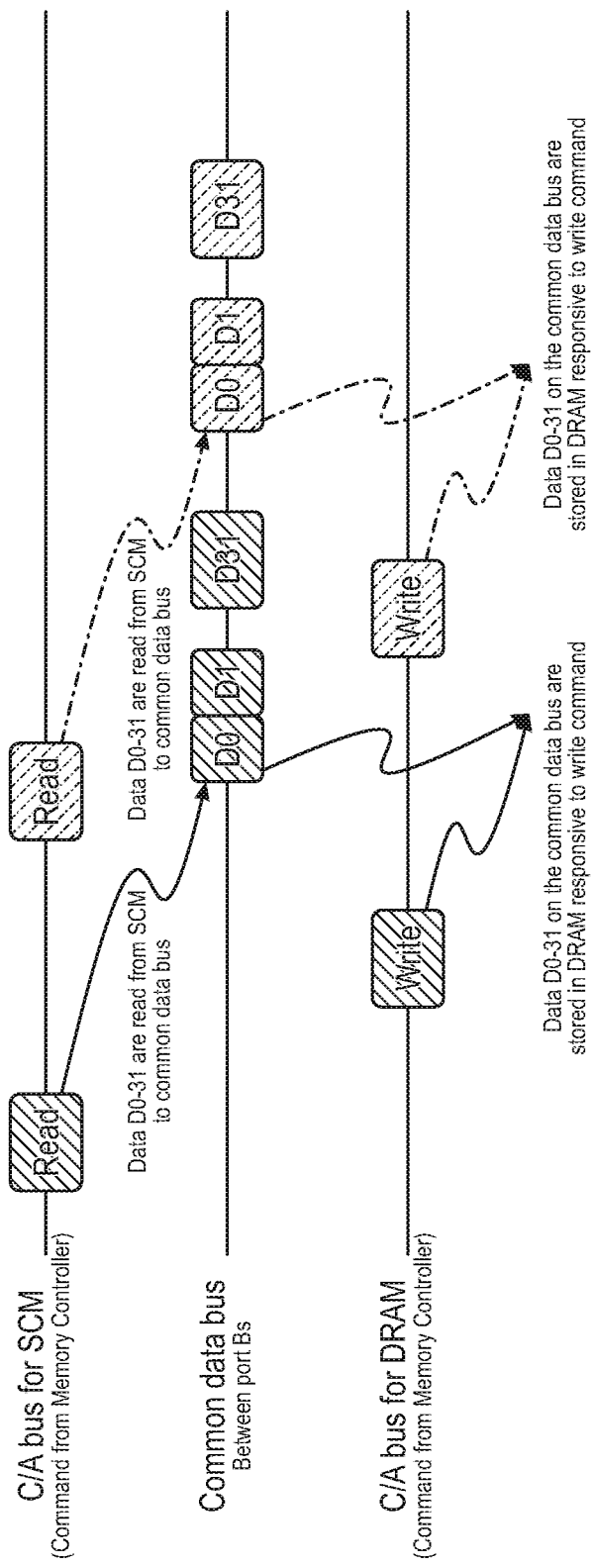
FIG. 7 is a timing diagram of data transfer between the plurality of memory devices in the hybrid memory system of FIG. 1, in accordance with an embodiment of the present disclosure.

FIG. 7 is a timing diagram of data transfer between the plurality of memory devices in the hybrid memory system of FIG. 1, in accordance with an embodiment of the present disclosure. For example, the data transfer in FIG. 7 may correspond with description regarding FIG. 6B, where data may be transferred from the memory chip 1b to the memory chip 1a. The memory controller 22 may provide a read command on a command and address (C/A) bus to port B of the memory chip 1b (e.g., SCM), and subsequently the memory controller 22 may provide a write command on a command and address (C/A) bus to port B of the memory chip 1a (e.g., MUM). Following the write command to port B of the memory chip 1a, the memory chip 1b may provide data D0-D31 on a common data bus between ports B of the memory chips 1b and 1a and thus the data D0-D31 may be provided to the memory chip 1a. The data D0-D31 may be read from the memory chip 1b responsive to the read command and the data D0-D31 may be further stored into the memory chip 1a responsive to the write command, thus the data transfer may be executed.

Figure 8:
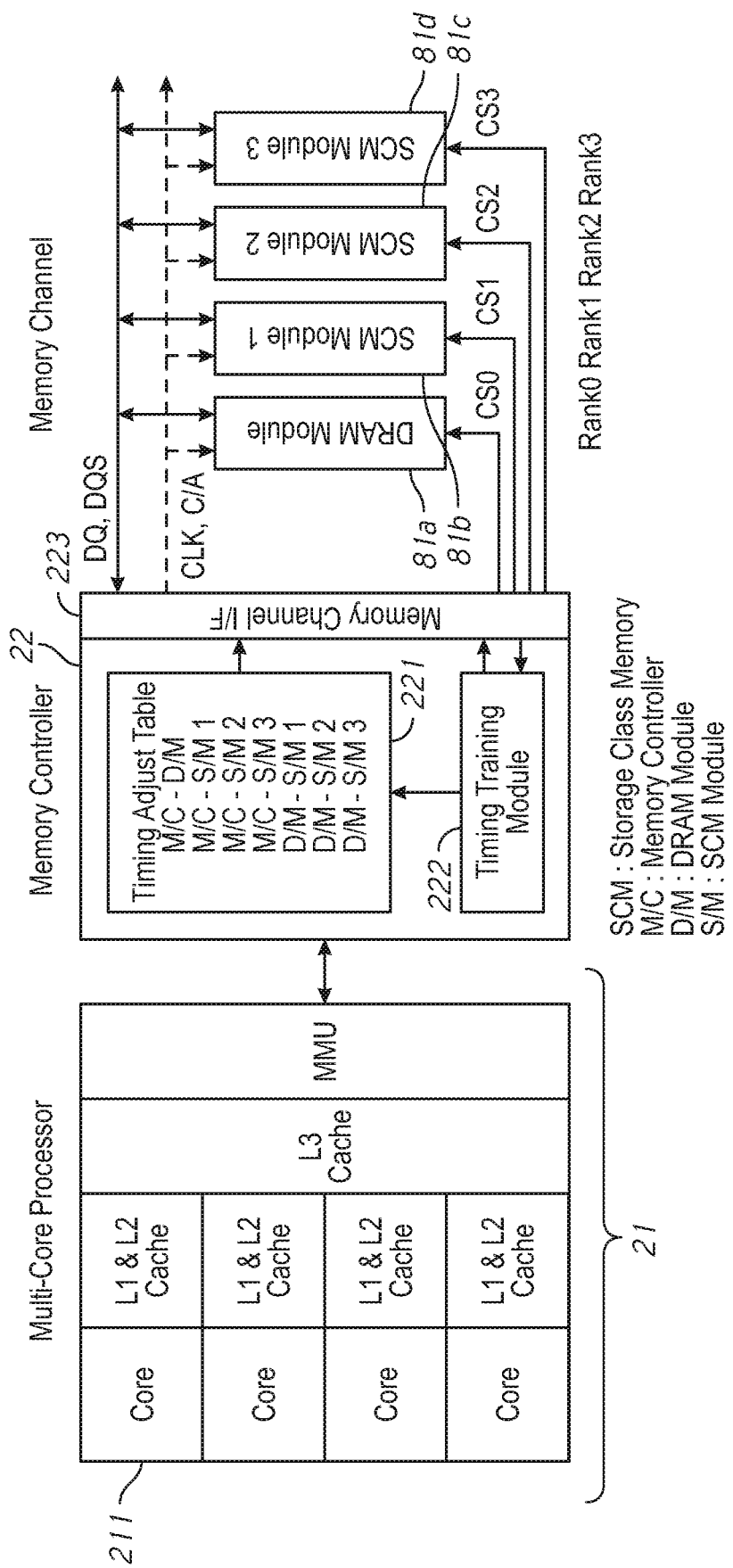
FIG. 8 is a schematic diagram of a memory controller including a timing training module accessing between a processor, the memory controller and the plurality of memory devices in the hybrid memory system of FIG. 1, in accordance with an embodiment of the present disclosure.
Figure 9:
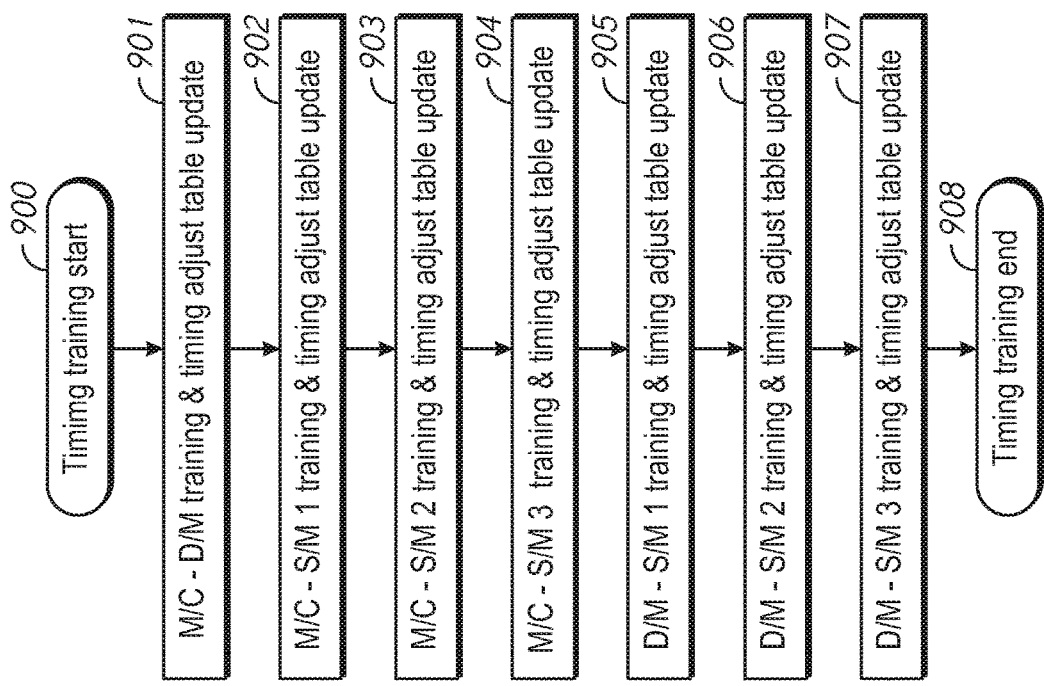
FIG. 9 is a flow diagram of training of data transfer with accessing the hybrid memory system of FIG. 1, in accordance with an embodiment of the present disclosure.

FIG. 8 is a schematic diagram of a memory controller including a timing training module accessing between a processor, the memory controller and the plurality of memory devices in the hybrid memory system of FIG. 1, in accordance with an embodiment of the present disclosure. Description of components and functionality corresponding to components included in and previously described with reference to the multi-core processor 21 will not be repeated. The memory controller (M/C) 22 may further include a timing training module 222 and a timing adjustment table 221. The timing training module 222 may perform training to memory chips, such as a DRAM module (D/M) 81a and SCM Modules 1-3 (S/M) 81b-d, and may update the timing adjustment table including timing adjustment parameters for relationships between the memory controller 22 and the memory chips 81a-d (M/C-D/M, M/C-S/M 1, M/C-S/M 2, M/C-S/M 3), and between the memory chips 81a-d (D/M-S/M 1, D/M-S/M 2, D/M-S/M 3). A memory channel interface (I/F) 223 in the memory controller 22 may adjust timings of the memory chips using the timing adjustment parameters in the timing adjustment table 221 corresponding to ranks, Rank0, Rank1, Rank2 and Rank3. Each of Rank0, Rank1, Rank2 and Rank3 may include one or more memory modules that may be coupled to the same channel, and may be accessed responsive to a corresponding one of chip-select signals, CS0, CS1, CS2 and CS3. The memory channel I/F 223 of the memory controller 22 may provide a clock signal, command and address (C/A) signals on a common clock bus and a common C/A bus coupled to the memory chips 81a-d. A data strobe signal DQS and data signals DQ may be transmitted on a common data bus among the memory channel I/F 223 and the memory chips 81a-d, and data signals. FIG. 9 is a flow diagram of training of data transfer with accessing the hybrid memory system of FIG. 1 or FIG. 8, in accordance with an embodiment of the present disclosure. In operation block 900, the timing training module 222 of the memory controller 22 may start timing training of the memory chips 81a-d. In operation block 901, the timing training module 222 may execute training between the memory controller (M/C) 22 and the DRAM module (D/M) 81a and may update the timing adjustment table 222 by including a timing adjustment parameter for a relationship between the memory controller 22 and the DRAM module (D/M) 81a once the training is complete. In operation block 902, the timing training module 222 may execute training between the memory controller (M/C) 22 and the SCM module 1 (S/M 1) 81b and may update the timing adjustment table 222 by including a timing adjustment parameter for a relationship between the memory controller 22 and the SCM module 1 (S/M 1) 81b once the training is complete. In operation blocks 903 and 904, similarly the timing adjustment table 222 may be updated by including timing adjustment parameters for relationships between the memory controller 222 and the SCM module 2 and 3 81b and 81c, respectively. In operation blocks 905 to 907, the timing adjustment table 222 may be updated by including timing adjustment parameters for relationships between the DRAM module 81a and the SCM module 1—the SCM module 3 81b-81d, respectively. Once the timing adjustment parameters are updated, the timing training may end in operation block 908.

Figure 10:
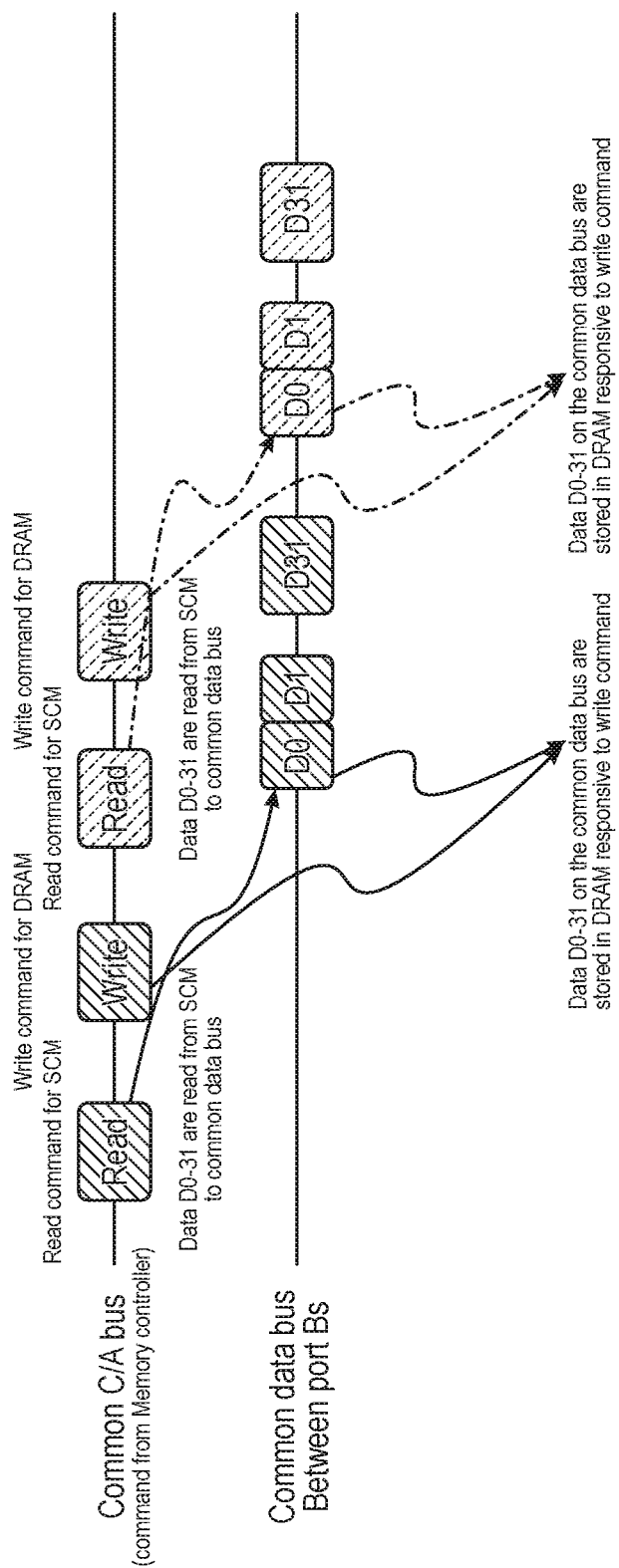
FIG. 10 is a timing diagram of data transfer between the plurality of memory devices in the hybrid memory system of FIG. 1 during the training of FIG. 9, in accordance with an embodiment of the present disclosure.

FIG. 10 is a timing diagram of data transfer between the plurality of memory devices in the hybrid memory system of FIG. 1 during the training of FIG. 9, in accordance with an embodiment of the present disclosure. For example, the data transfer in FIG. 10 may correspond with description regarding FIGS. 8 and 9, where data may be transferred from one memory chip of the memory chips 81b-d (e.g., SCM modules 1-3) to the memory chip 81a (e.g., DRAM module). The memory controller 22 may provide a read command on a common command and address (C/A) bus of the memory chips 81a-d while activating one chip select signal line of chip select signal lines CS1-3 provided to the SCM modules 1-3 81b-d, and subsequently the memory controller 22 may provide a write command on the common command and address (C/A) bus of the memory chips 81a-d while activating a chip select signal line CS1 provided to the DRAM module 81a. Following the write command to the common C/A bus while activating the DRAM module 81a, one of the SCM modules 1-3 81b-d activated by the one chip select signal line together with the read command may provide data D0-D31 on a common data bus between ports B of the memory chips 81a-d. The data D0-D31 may be read from the activated one of the SCM modules 1-3 81b-d responsive to the read command and may be further stored into the DRAM module 81a responsive to the write command, thus the data transfer may be executed. In the above description, the chip select signal lines CS1-3 may be used to signal a chip that is subject to the read/write commands, however, the chip may be identified by an address signaled by the address signals, or a chip identifier (ID) included in the read/write commands.

Figure 11:
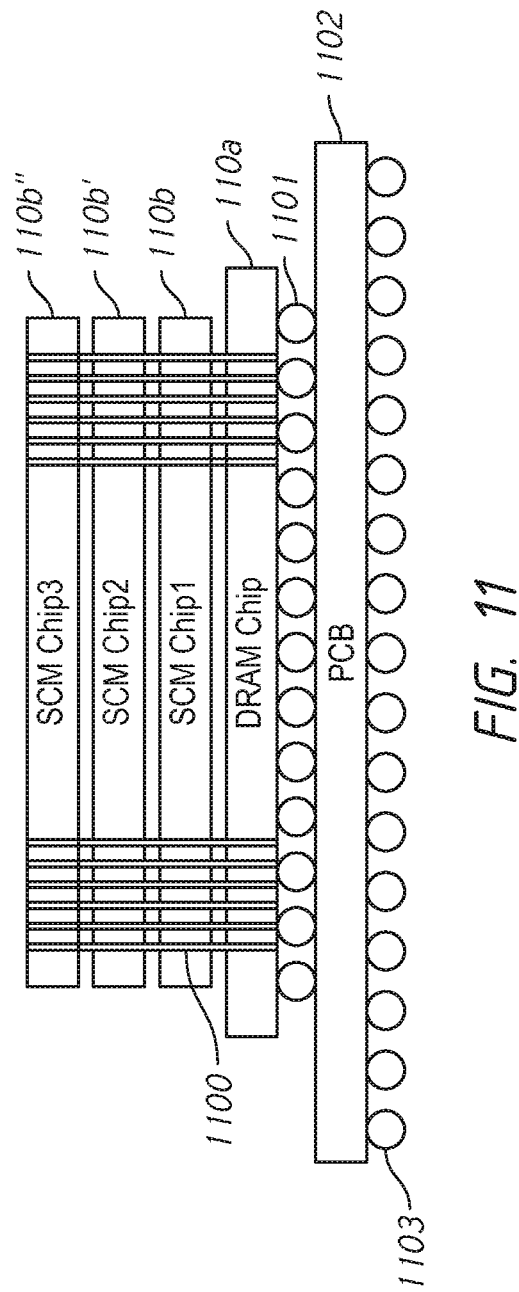
FIG. 11 is a schematic diagram of the hybrid memory system of FIG. 8, in accordance with an embodiment of the present disclosure.

FIG. 11 is a schematic diagram of the hybrid memory system of FIG. 8, in accordance with an embodiment of the present disclosure. For example, the hybrid memory system may be a three-dimensional (3D) hybrid memory device. For example, the hybrid memory system may include an HBM, an HMC, a Wide-IO DRAM, etc. The hybrid memory system may include a plurality of kinds of memory chips, such as a DRAM chip 110a and SCM Chips 1-3 110b, 110b' and 110b'', stacked with each other. Each memory chip of the DRAM chip 110a and the SCM Chips 1-3 110b, 110b' and 110b'' may include a plurality of memory cells and circuitries accessing the memory cells. The hybrid memory system may include memory channels 1100. For example, the memory channels 1100 may including conductive vias TSVs (e.g., through substrate electrodes) through penetrating the DRAM chip 110a and the SCM Chips 110b' and 110b'' and microbumps which couple the TSVs through the DRAM chip 110a and the SCM Chips 1-3 110b, 110b' and 110b" together. The conductive vias TSVs 1100 may provide high speed transmission with low power consumption, compared to conventional DiMM channels, for example. The DRAM chip 110a may be coupled to a printed circuit board (PCB) 1102 via interconnects, such as bumps 1101. For example, the bumps 1101 may be microbumps having bump pitches of less than about or less than one hundred micro meters and exposed on an outside of the DRAM chip 110a. A portion of the bumps 1101 may be coupled to one or more power lines. Another portion of the bumps 1101 may be coupled to a plurality of memory channels 1100. The PCB 1102 may be on solder balls 1103 which may couple the bumps 1101 to a memory controller (not shown, e.g., the memory controller 22).

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

What is claimed is:

1. An apparatus comprising:
a first memory including first and second ports, each port associated with a respective channel;
a second memory including third and fourth ports, each port associated with a respective channel; and
a controller configured to control each of the first and second memories to perform a data read operation and a data write operation;
wherein the first port includes a first set of data terminals coupled to the controller and is configured to transfer second data between the first memory and the controller, and the second port includes a second set of data terminals,
wherein the third port includes a third set of data terminals coupled to the controller and is configured to transfer third data between the second memory and the controller, and the fourth port includes a fourth set of data terminals coupled to the second set of data terminals of the second port of the first memory, and
wherein the first and second memories are configured to transfer first data therebetween through the second and fourth ports without the first data being temporarily fetched in the controller.

2. The apparatus of claim 1, wherein the first memory includes a plurality of volatile memory cells and wherein the second memory includes a plurality of non-volatile memory cells.

3. The apparatus of claim 1, wherein the controller is further configured to provide a first command to the second port, the first command being indicative of a data read operation to cause the second port to provide the first data, and
wherein the controller is further configured to provide a second command to the fourth port, the second command being indicative of a data write operation to cause the fourth port to receive the first data.

4. The apparatus of claim 1, wherein the controller is further configured to provide a first command indicative of the data read operation to the first memory and further configured to provide a second command indicative of the data write operation to the second memory,
wherein the first memory is configured to provide the first data responsive to the first command, and
wherein the second memory is configured to store the first data responsive to the second command.

5. The apparatus of claim 4, further comprising:
a data bus interconnecting the controller and the first and second memories with one another,
wherein the first memory is further configured to transfer second data between the first memory and the controller,
wherein the second memory is further configured to transfer third data between the second memory and the controller, and
wherein each of the first, second and third data is transferred through the data bus.

6. The apparatus of claim 5, further comprising:
a first chip select signal line from the controller and the first memory; and
a second chip select signal line from the controller and the second memory,
wherein the controller is configured to provide the first command while activating the first chip select signal line, and further configured to provide the second command while activating the second chip select signal line.

7. The apparatus of claim 5, wherein the controller is further configured to provide address signals indicative of a first memory cell in the first memory while transmitting the first command, and
wherein the controller is further configured to provide the address signals indicative of a second memory cell in the second memory while transmitting the second command.

8. The apparatus of claim 5, wherein the first command includes a first chip identifier indicative of the first memory and wherein the second command includes a second chip identifier indicative of the second memory.

* * * * *